| United States Patent [19] | [11] | 4,335,228 |
|---|---|---|
| Beitchman et al. | [45] | Jun. 15, 1982 |

[54] ISOCYANATE BLOCKED IMIDAZOLES AND IMIDAZOLINES FOR EPOXY POWDER COATING

[75] Inventors: Burton D. Beitchman, Springfield; Philip J. Zaluska, Schnecksville, both of Pa.

[73] Assignee: Air Products and Chemicals, Inc., Allentown, Pa.

[21] Appl. No.: 881,339

[22] Filed: Feb. 27, 1978

[51] Int. Cl.³ ............... C08G 18/58; C08G 59/40
[52] U.S. Cl. ............................ 525/528; 528/45; 528/52; 528/94; 528/117
[58] Field of Search ............... 260/47 EN, 77.5 R; 528/93, 94, 45, 117, 367; 525/528

[56] References Cited

U.S. PATENT DOCUMENTS

| 3,227,679 | 1/1966 | Brown | 260/47 |
|---|---|---|---|
| 3,321,549 | 5/1967 | Barth | 260/830 |
| 3,407,175 | 10/1968 | Presley et al. | 260/47 |
| 3,438,937 | 4/1969 | Christie | 260/47 |
| 3,489,695 | 1/1970 | Green | 260/2 |
| 3,896,082 | 7/1975 | Rensmann et al. | 260/47 EN |
| 3,956,237 | 5/1976 | Doorakian et al. | 260/47 EN |
| 3,989,673 | 11/1976 | Jenkins et al. | 260/47 EN |

*Primary Examiner*—Earl A. Nielsen
*Attorney, Agent, or Firm*—Russell L. Brewer; E. Eugene Innis; James C. Simmons

[57] ABSTRACT

This invention relates to the use of an isocyanate blocked imidazole or imidazoline compound as a catalyst for effecting cure of powdered epoxy resins. The isocyanate blocked imidazole or imidazoline imparts an extended pot life to a curable epoxy powder coating composition while effecting cure at substantially lower temperatures than normally would be required and with faster cure times.

16 Claims, No Drawings

4,335,228

ISOCYANATE BLOCKED IMIDAZOLES AND IMIDAZOLINES FOR EPOXY POWDER COATING

BACKGROUND OF THE INVENTION

1. Field of the Invention

This invention relates to a process for curing epoxy powder coating compositions and to epoxy powder coating compositions utilizing an isocyanate blocked imidazole and imidazoline catalyst.

2. Description of the Prior Art

In recent years there has been a substantial amount of work in the development of powder coating systems for application to a variety of substrates. The use of powder coatings overcomes many of the environmental problems liquid, resinous coating compositions have presented in manufacturing, particularly where a volatile organic solvent is used as the carrier.

Essentially two methods of formulating epoxy powder coating systems have been used. One method is to grind the epoxy powder coating and combine it with various additives, pigments and catalysts in a blender and then apply this physical blend to a substrate and cure at elevated temperature. The second technique has been to melt mix the epoxy resin with various additives, pigments and catalysts and extrude this melt mix into a thin ribbon and cooling to form a solid. This solid is then ground into a finely divided form, e.g. 250 microns or less depending on whether the coating is to be used for decorative or functional purposes. The latter method of formulating epoxy powder coatings has significant advantages in that it permits greater uniformity of dispersion of additives, pigments, and catalyst within the resin itself so that the end coating is not spotty and nonuniform. It also presents the most difficulty in formulation due to the fact that many catalysts are too reactive at the melt mix temperature, and those that are not are too slow at cure temperature or require a high cure temperature.

There are a number of patents which disclose the use of various catalyst systems for epoxy powder coatings and catalyst systems based on imidazoles and imidazoline. Representative of these patents are:

U.S. Pat. No. 4,041,007 discloses a combination of imidazole and substituted imidazoles with clay filler and an aromatic amine as a catalyst system for epoxy resins. The particular combination of clay filler and imidazole retards the catalytic activity of the aromatic amine thereby enhancing the pot life of the epoxy resin.

U.S. Pat. No. 3,896,082 discloses the use of imidazoline derivatives as a hardner for epoxy powder coating systems. The imidazolines are alleged to eliminate long setting times and high cure temperatures. In addition, the catalyst properties improved leveling characteristics in gloss and increased resistance to washing solutions.

U.S. Pat. No. 3,956,237 discloses the use of a latent amine curing agent and an accelerator for epoxy resin compositions. The latent amine curing agents are prepared by reacting alpha-substituted aromatic mono or diisocyanates with an alkyl or phenyl substituted secondary amine or a saturated heterocyclic amine such as pyrrolidine or alkyl substituted pyrrolidine. These accelerators are used in combination with a latent amine such as dicyandiamide. One of the problems with the accelerators disclosed here is that they are not extremely reactive without the dicyandiamide present.

U.S. Pat. No. 3,677,978 discloses that imidazoles can be used to effect a rapid cure of epoxy resins and that the shelf life of the epoxy resins can be extended by including a polyvalent metal salt, e.g. a copper salt.

U.S. Pat. Nos. 3,931,117 and 3,898,978 disclose the use of an epsilon-caprolactam organic polyisocyanate as a catalyst for hydroxyl containing polymers, e.g. polyesters, hydroxycontaining acrylics and epoxy resins.

U.S. Pat. No. 4,041,019 discloses an isocyanate capped imidazole as a delayed-action, heat activated catalyst for effecting cure of polyurethanes. An example of an isocyanate capped imidazole is a toluene diisocyanate capped imidazole. Curing temperatures for the urethanes are approximately 120° C.

U.S. Pat. No. 3,989,673 discloses a catalyst system which is effective for curing epoxy resins at low temperatures. The catalyst system is a substituted imidazole such as 2-ethyl-4-methyl imidazole and piperidine.

U.S. Pat. No. 4,007,299 discloses the formation of a coated substrate having a matt finish from a mixture of a powdered epoxy compound, and a N-containing salt of a carboxylic acid having three or more carboxyl groups and a cyclic amidine by heating the mixture to a temperature of about 175°–220° C. An example of an N-containing salt and a cyclic amidine is the reaction product of imidazoline and trimellitic acid.

U.S. Pat. No. 3,909,480 discloses an epoxy resin composition having excellent curability and storage stability which includes as the catalyst system a complex of a tetraphenyl borate and imidazole.

U.S. Pat. No. 3,538,039 discloses a heat curable epoxy resin composition which is stable at room temperature, but cures in 1 to 5 minutes at 275° to 300° F. The curable composition is an adduct of a polyepoxide and an amine, a polyfunctional anhydride such as trimellitic anhydride and an activator such as an imidazole or substituted imidazole.

SUMMARY OF THIS INVENTION

This invention relates to (a) an improvement in a process for curing a finely divided 1-2 epoxy compound having a lower softening point of not less than 40° C. by heating the epoxy compound to an elevated temperature in the presence of a catalyst, and (b) the curable epoxy compound. The improvement in the process resides in the use of a blocked adduct formed by reacting a polyisocyanate with a secondary amine selected from the group consisting of imidazole and imidazoline as the catalyst or catalyst component.

There are many advantages associated with the process for curing the powdered epoxy resin composition and to the curable epoxy resin composition itself as compared to the prior art. These advantages include:

an epoxy resin having outstanding pot life at room temperature thus permitting shipment and storage of one component powdered epoxy systems;

an epoxy resin having a cure temperature, e.g., from about 250° F. to 400° F. depending upon the particular powdered epoxy composition to be cured, which is lower than many conventional catalysts thereby resulting in a savings of substantial energy;

fast cure times at the lower cure temperatures thus permitting an equivalent rate of production with lower energy costs;

an initiation temperature sufficiently high to permit formulators to melt mix the epoxy coating with pigments and additives, as well as the catalyst system without gelling the epoxy resin;

a desirably long gel time which permits the epoxy powder to melt and flow to form a cured coating not having substantial wrinkling or "orange peel".

a catalyst system which eliminates or at least reduces yellowing of the powdered epoxy resin on cure; and an ability to enhance the impact strength of the coating composition as compared to the same composition cured with conventional catalysts.

DESCRIPTION OF THE PREFERRED EMBODIMENTS

In the practice of this invention the epoxy resins are those which are solid at room temperature, and preferably those which have a lower melting point of not less than 40° C., and preferably not less than 60° C. These epoxy resins are 1,2-epoxy compounds with an epoxy equivalent weight of from about 500–1,000. Typically, these epoxy resins are of the bis-phenol A type and are formed by reacting dihydroxy compounds with epichlorohydrin in the presence of alkali. Specific examples of dihydroxy compounds which can be used for reaction with epichlorohydrin are 2,2-bis-(4-hydroxyphenyl)-propane; 4,4'-dihydroxybenzophenone; 1,1-bis(4-hydroxyphenyl)-ethane; bis(2-hydroxynaphthyl) methane; and 1,5-dihydroxynaphthylene.

The catalyst system which is used can be described as an isocyanate blocked imidazole or imidazoline, preferably extended with a polyol. These particular compounds have been found to be inactive at relatively low temperatures, e.g., 120° F. or less thus permitting the formulation of epoxy molding compounds having extended shelf life, but yet reactive at elevated temperatures, e.g. above 270° F. to provide for extremely rapid cure times. The catalyst systems generally are formed by reacting a polyisocyanate, preferably a diisocyanate with a secondary amine selected from the group consisting of an imidazole or imidazoline as represented by Formulas 1 and 2

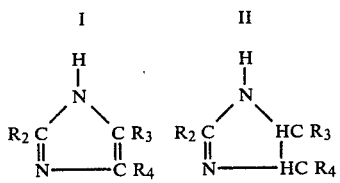

wherein
$R_2$ is hydrogen, hydrocarbyl, or inertly substituted hydrocarbyl;
$R_3$ and $R_4$ are each independently hydrogen, hydrocarbyl, or inertly substituted hydrocarbyl provided $R_3$ and $R_4$ are not a fused aromatic.

In the above definition hydrocarbyl is intended to include alkyl and cyclic groups such as phenyl, naphthyl, cyclopentyl or cyclohexyl groups. Only where such groups $R_3$ and $R_4$ are combined to form a fused aromatic ring do such groups adversely affect the cure of the epoxy.

Examples of secondary amines which fall within the scope of the formulas include imidazole, 2-methyl imidazole, 2-ethyl-4-methyl imidazole, 2-undecyl imidazole, 2-heptadecyl imidazole, 2-ethyl imidazole, 2,4-dimethyl imidazole; 2-methyl imidazoline; 2,4-dimethyl imidazoline; 2-ethyl imidazoline; and others. These compounds can be substituted with various groups inert to the epoxy compositions and include for example such substituents as halogen atoms, e.g. chlorine and bromine atoms in particular; nitro groups, and alkyl $C_{1-3}$ substituents. Such substituted compounds are included within the inertly substituted formula definition.

The imidazole and imidazoline secondary amine compositions are blocked by reacting the secondary amine hydrogen with a polyisocyanate composition. Such polyisocyanates include for example, aliphatic, cycloaliphatic as well as aromatic isocyanates. The isocyanates are polyisocyanates as opposed to monoisocyanates in that monoisocyanates result in leaving residual monoisocyanate reactant in the epoxy material. Because of their higher volatility, they often present problems to formulators. Examples of polyisocyanates which can be used in practicing the invention include toluene diisocyanate, isophorone diisocyanate, oxydiethylene diisocyanate, ethylene diisocyanate, hexamethylene diisocyanate, thiodiethylene diisocyanate, diphenyl methane diisocyanate and the like. The preferred diisocyanate used in the catalyst preparation is toluene diisocyanate and isophorone diisocyanate.

In a particularly desirable embodiment of the invention, it is advantageous to extend the catalyst system by reacting one equivalent of isocyanate with a polyol to form a high molecular weight compound having residual isocyanate functionality. The reaction of the isocyanate with the polyol increases the molecular weight of the material thereby reducing its volatility. Particularly effective polyols for extending with the isocyanate blocked imidazole or imidazoline are diethylene glycol, trimethylol propane, pentaerythritol, ethylene glycol, triethylene glycol, and various other alkanediols such as butane and hexane diol.

The isocyanate blocked imidazole or imidazoline catalysts are formed by reacting a substantially stoichiometric quantity of the imidazole or imidazoline with the isocyanate although an excess of isocyanate functionality can be tolerated in the catalyst. Where an excess functionality of the secondary amine is present, the pot life of the epoxy resin is reduced. Of course that aspect follows because of the high reactivity of imidazole or imidazoline. On a molar basis from about 0.8–1.0 moles secondary amine per equivalent of isocyanate are reacted to form the catalyst composition. When the composition is extended with a polyol, from about 0.2 to 0.5 mole equivalents hydroxyl group and the balance secondary amine are reacted per mole equivalent of isocyanate. For example, where diethylene glycol, 2-methyl imidazole, and toluene diisocyanate are reacted to form the catalyst composition, then about 0.5–1 moles diethylene glycol, 1.5–2 moles 2-methyl imidazole and 2 moles toluene diisocyanate are reacted to form the catalyst composition.

The catalyst is included in the epoxy compound in a proportion sufficient for enhancing the cure rate of the epoxy at a temperature of 300° F. Since the catalyst composition is unreactive at temperatures of about 120° F. or less, the pot life of the epoxy resin inherently will be extended. Broadly, the catalyst is included in a proportion of from about 1 to 15 parts per 100 parts (phr) of epoxy resin by weight, and preferably from 3–10 parts per 100 parts of epoxy resin. Generally, this range is sufficient to supply sufficient imidazole to catalyze the reaction. Where the amine concentration is reduced, e.g., in a polyol extended catalyst, the level of catalyst may have to be extended.

It is understood the catalyst level may be optimized within these ranges for obtaining desired results. High viscosity epoxy resins may require a slightly lower level of catalyst or cure temperatures so that gelation does not occur too quickly and result in the formation of pinholes.

The catalyst may also be supplemented with conventional catalysts, e.g. dicyandiamide to give a catalyst activated at a higher temperature than the isocyanate blocked catalyst above. This combination may be desirable in formulating certain epoxy systems. A preferred formulation is from about 2–9 phr of isocyanate blocked catalyst and 2–5 phr dicyandiamide.

In preparing the epoxy powder coating systems, conventional additives, pigments, leveling agents commonly used in epoxy coatings can be used as desired. For example, various leveling agents which can be used to enhance the flow of the epoxy under curing conditions are polymeric or monomeric acetals such as polyvinylformal polyvinylacetal, diethyl-2-ethyl hexanol acetal, di-2-ethylhexyl acetaldehyde-acetal; and polyglycols and polyglycol ethers such as polyethylene glycol, polypropylene glycol.

Pigments and additives which can be added to the epoxy resins include titanium dioxide, barytes, antimony oxide, cadmium red, and fillers such as calcium carbonate, calcium sulfate, glass, and the like.

The following examples are provided to illustrate preferred embodiments of the invention and to make comparisons with some of the prior art catalyst compositions. All percentages are expressed in weight percentages.

EXAMPLE 1

Preparation of Imidazole-Isophorone Diisocyanate.

In a three-neck flask, provided with a magnetic stirrer, thermometer, and dropping funnel, there was placed 17.1 grams (0.25 moles) imidazole, 75 ml tetrahydrofuran, and 0.1 gram dibutyl tin dilaurate. After this material was mixed and the imidazole dissolved, 27.9 grams (0.125 moles) of isophorone diisocyanate was added dropwise while keeping the temperature between about 18°–25° C. with an ice water bath. After the isophorone diisocyanate was added, the solution was stirred for two hours and then allowed to stand for about a 12-hour period at room temperature (70° F). Isocyanate analysis showed that all of the isocyanate had reacted. The product was recovered by flashing the tetrahydrofuran at 55° C. under vacuum and then drying by placing the solids in a vacuum oven at 60° C. About 44 grams of isophorone diisocyanate blocked imidazole product was recovered.

EXAMPLE 2

Preparation of Polyol Extended Isocyanate and Blocked Isocyanate

In a five liter, 3-neck flask provided with a mechanical stirrer, thermometer, condenser and addition funnel there was placed 1,044 grams (6 moles) toluene diisocyanate (a blend of 80% 2,4- and 20% 2,6-toluene diisocyanate) and 600 ml tetrahydrofuran, previously dried over a molecular sieve. The mixture was stirred and heated to a reflux temperature of about 85°–90° C. Then 318 grams (3 moles) of diethylene glycol was added dropwise to the flask through the addition funnel over a 40-minute period. The mixture was stirred for an additional hour at reflux temperature and then allowed to stand for a period of about 48 hours. Isocyanate analysis showed an isocyanate content of 13.13%. The solution was heated again for another hour and on analysis was found to contain 12.91% isocyanate.

Then, 397 grams (5.83 moles) imidazole dissolved in 1,000 ml of tetrahydrofuran was added dropwise to the reaction mixture and stirred while the temperature was held to about 30°–42° C. (This level of imidazole was calculated to provide a molar ratio of 1 mole diethylene glycol, 2 moles toluene diisocyanate, and about 2 moles imidazole). After all of the imidazole solution had been added, the material was permitted to react for an additional hour at room temperature (25° C.). When isocyanate analysis showed the product to be free of unreacted isocyanate, the product was precipitated by pouring the reaction mixture into pentane (1 volume reaction mixture per 3 volumes pentane). The precipitate was recovered by filtration and the solid product dried in a vacuum oven at 55°–60° C. Approximately 1752 grams of diethylene glycol-toluenediisocyanate-imidazole (DEG-TDI-I) adduct product was obtained.

EXAMPLE 3

Gel Times

The gel time for the toluene diisocyanate blocked imidazole adduct of Example 2 was compared with a conventional high temperature activated catalyst for epoxy resin in the following manner.

A commercially available epoxy resin having an epoxide equivalent weight (grams of resins containing 1 gram equivalent weight of epoxide) of 730–840, a softening point of 88–98 as measured by Durran's mercury method in degrees Centigrade, a viscosity of O-S as measured in a 40% by weight solution in Dowanol DB glycol ether solvent, a cast density of 9.9 pounds per gallon and a specific gravity of 1.19 and sold under the trademark D.E.R. 663U by the Dow Chemical Company was finely ground into a powder having a particle size of from about 70–100 microns. The solid catalysts to be evaluated were also ground into a finely divided form and mixed with the epoxy resin at a level of 5 parts per 100 parts of resin (phr). The mixture of epoxy resin and catalyst then was placed on a metal plate maintained at a specific temperature and the gelation time was measured by stirring the mixture of epoxy resin and catalyst in its molten state until the mixture could no longer be stirred. That time in which the liquid converted from a liquid to a solid was the gelation time. Cure time was measured as that time in which all the epoxy units had completely reacted to form a flexible material as opposed to the brittle structure that is obtained at gelation. The results of the tests are set forth as follows:

| | Catalyst | Time |
|---|---|---|
| 1. | gelation at 400° F. for dicyandiamide (dicy) | 60 seconds |
| 2. | gelation at 400° F. Ex. 2 adduct | 18 seconds |
| 3. | cure at 400° F. for dicy approx. | 15 minutes |
| 4. | cure at 400° F. for Example 2 adduct approx. | 5 minutes |
| 5. | gelation at 270° F. for dicy | 300 seconds |
| 6. | gelation at 270° F. for Ex. 2 adduct | 68 seconds |
| 7. | gelation at 270° F. 50% dicy and 50% Ex. 2 adduct by weight | 150 seconds |
| 8. | gelation at 360° F. 50% dicy and 50% Ex. 2 adduct | 45 seconds |

The above results show that for this simple mixture of commercially available epoxy resin and catalyst, the polyol extended toluene diisocyanate blocked imidazole adduct is much more reactive than the high temperature activated dicyandiamide in that gelation occurs at approximately one-third to two-fifths the time required for dicyandiamide at 400° F. and 270° F., respectively. The results showed that cure times at 400° F. are much shorter for the blocked imidazole adduct. But, more importantly, cures can be effected with the blocked imidazole at lower temperatures.

was 210° F. The extrusion screw was rotated at 100 RPM and the feed screw at 16 RPM. The extruded sheet then was crushed, pulverized into a powder and sieved through a 200 mesh (74 micron) sieve. Typically, the sieved product then was electrostatically sprayed onto a metal (Bonderite 1000 panel) at various thicknesses and cured under conditions described.

After the materials were cured, various measurements were made and are referred to in Table 1 below.

TABLE 1

| Catalyst | Temp. °F. | phr | Coating Thickness | Cure Time | Impact 3/8" Sphere (in pds) Open | Reverse | 60°Gloss | MEK double rub | (Pencil) Hardness | Appearance |
|---|---|---|---|---|---|---|---|---|---|---|
| Ex. 1 | 270° F. | 5 | 2.4 | 10 min. | P-60 | P-60 | 73 | P-100 | 4H+ | S-Y-ORP |
| " | 270° F. | " | 2.5 | 15 min. | P-60 | P-60 | 91 | P-100 | 4H+ | S-Y-ORP |
| " | 270° F. | " | 2.5 | 20 min. | P-60 | P-60 | 87 | P-100 | 4H+ | S-Y-ORP |
| " | 270° F. | " | 2.2 | 30 min. | P-60 | P-60 | 79 | P-100 | 3H+ | S-Y-ORP |
| " | 270° F. | " | 2.2 | 40 min. | P-60 | P-60 | 64 | P-100 | 4H+ | S-Y-ORP |
| " | 300° F. | " | 2.6 | 10 min. | P-60 | Fs-60 | 86 | P-100 | 4H+ | S-Y-ORP |
| " | 300° F. | " | 2.2 | 15 min. | P-60 | P-60 | 83 | P-100 | 4H | S-Y-ORP |
| " | 300° F. | " | 2.2 | 20 min. | P-60 | P-60 | 83 | P-100 | 4H | S-Y-ORP |
| " | 300° F. | " | 2.4 | 30 min. | P-60 | P-60 | 85 | P-100 | 4H | S-Y-ORP |
| " | 300° F. | " | 2.7 | 40 min. | P-60 | P-60 | 93 | P-100 | 4H+ | S-Y-ORP |
| " | 360° F. | " | 2.5 | 5 min. | P-60 | Fs-60 | 94 | P-100 | 3H+ | Y-S-ORP |
| " | 360° F. | " | 2.2 | 10 min. | P-60 | Fs-60 | 93 | P-100 | 3H+ | Y-S-ORP |
| " | 360° F. | " | 2.5 | 20 min. | P-60 | P-60 | 99 | P-100 | 3H+ | Y-S-ORP |
| " | 360° F. | " | 2.1 | 30 min. | P-60 | Fs-60 | 99 | P-100 | 4H | Y-S-ORP |
| " | 360° F. | " | 2.1 | 40 min. | P-60 | Fs-60 | 94 | P-100 | 4H | Y-S-ORP |

P-pass
Fs-microscopic failure
S-slight
Y-yellow
ORP-orange peel
MEK-methylethyl ketone
V-very
impact (inch lbs)

EXAMPLE 4

The gelation time for the isophorone diisocyanate blocked imidazole of Example 1 was measured in the same manner as in Example 3. Gelation at 270° F. was 64 seconds; at 300° F. gelation was 47 seconds; and 360° F. gelation was 26 seconds. The 270° F. gelation time is about the same as that obtained for the diethylene glycol-toluene diisocyanate-imidazole adduct thus showing there is substantial similarity in the performance of the isocyanate blocked imidazole catalyst.

EXAMPLE 5

Preparation of Melt Mix Epoxy Powder Coating

The catalyst system of Example 1 was tested for its effectiveness in a powder coating composition by melt mixing an epoxy powder composition sold under the trademark D.E.R. 663U by the Dow Chemical Company and described in Example 3. The formulation comprised 908 g of D.E.R. 663U epoxy resin, 9 g of a leveling agent consisting of a complex, polymeric liquid sold under the trademark MODAFLOW-II by the Monsanto Company, 545 g titanium dioxide, and 45.5 g of the isophorone diisocyanate blocked imidazole of Example 1. This formulation was first blended in a V-blender for about one-half hour and then melt mixed for about one minute and extruded through a two roll-chill roll system into a 1/16" sheet. The extruder used was Model PR-46 sold by Buss Condux, Incorporated and the conditions in the extruder were 115° F. in the pre-heat section, and 210° F. in the outlet extruder section. More particularly, the screw temperature was 110° F., the middle temperature 110° F., and outlet temperature In Table 1, impact resistance was measured by a standard impact test which included dropping a three-eighths inch steel sphere weighing 2 pounds directly onto the coated Bonderite panel (open), and then onto the uncoated side (reverse). P in both the open direct and open reverse refers to pass and Fs refers to microscopic failure of the coating. The number value for the test is the inch-pounds force applied. In this case, 60 pounds was the maximum that could be recorded. The MEK double rub test was used to determine the resistance of the coating to methylethylketone solvent, and P or F represents pass or fail for 100 double runs. With respect to appearance, S refers to slight discoloration or orange peel, Y refers to yellow, and ORP represents an orange peel effect, i.e., a slightly wrinkled coating surface. The term ORP is not significant of color. The term V is representative of the adjective very which is used to give an indication as to the degree of discoloration, e.g. very yellow.

The results show that the Example 1 catalyst was effective for curing the epoxy resin at temperatures as low as 270° F. although better results in terms of gloss were obtained at cure temperatures of 300° F. Additionally, the catalyst did not impart substantial yellowing to the epoxy resin. It should be noted the catalyst is ineffective at temperatures below 200° F. thereby contributing to a long pot life, and yet the initiation temperature is sufficiently high to permit melt mixing and extrusion of the resin.

EXAMPLE 6

The procedure of Example 5 was followed except that the diethylene glycol extended toluene diisocyanate-imidazole adduct of Example 2 was substituted for the Example 1 isophorone diisocyanate-imidizole catalyst, and the level of catalyst was increased from 5 phr to 7 phr. After melt mixing the epoxy resin, the Modaflow II leveling agent, titanium dioxide, and Example 2 catalyst, the resin was extruded and ground to about 70 microns. As a preliminary indication as to the effectiveness of the catalyst, the gelation time was measured. At 270° F., the gelation time was 78 seconds, at 300° F., the gelation time was 57 seconds, at 360° F., the gelation time was 27 seconds, and at 400° F., the gelation time was 20 seconds.

A sample of the DEG-TDI-I was mixed with D.E.R. 663U resin at a level of 5 phr sprayed onto a panel and heated to 250° F. This temperature is lower than the 270° F. This temperature is lower than the 270° F. target cure temperature, but is about 40° F. above the extrusion temperature. When the coating was baked for 40 minutes, the impact was 120 inch lbs., 60° gloss 100, MEK 100 and hardness 100. At 30 minutes bake the impact was 100 inch pounds.

Table 2 below provides additional information with respect to physical properties of cured resinous products.

A trimethylol propane extended isophorone diisocyanate blocked imidazole adduct prepared by reacting one mole trimethylol propane with three moles isophorone diisocyanate and three moles imidazole (TMP-IPDI-I) was used alone and in combination with dicyandiamide in catalyzing the gelation of DER663U epoxy resin. At a level of 4 phr TMP-IPDI-I and 3 phr dicyandiamide, the gel time at 360° F. was 86 seconds and at 5 phr the TMP-IPDI-I had a gel time of 47 seconds at 360° F.

When dicyandiamide was used alone at 5 phr, the gel time at 360° F. was 300 seconds and at 8.3 phr the gel time was 300 seconds.

EXAMPLE 8

Several catalyst systems were evaluated in a melt mix operation using D.E.R. 663U epoxy resin in the same manner as in Example 3. Coatings were essentially 2–2.2 mils in thickness and the catalyst and concentration of the catalyst was varied as indicated. The resulting cured epoxy films were evaluated for a yellow index with a higher number indicative of a greater yellowish cast and lower number indicative of a whitish cast. In Table 3 below, D.E.H.-40 refers to a Dow Epoxy Hardner-40

TABLE 2

| Catalyst | Temp. °F. | phr | Coating Thickness | Cure Time | Impact ⅛" sphere (in. pds) Open | Reverse | 60°Gloss | MEK double rub | (Pencil) Hardness | Appearance |
|---|---|---|---|---|---|---|---|---|---|---|
| Ex. 2 | 270° F. | 7 | 2.1 | 10 min. | P-60 | Fs-30 | 100 | P-100 | 4H | S-Y-ORP |
| " | 300° F. | " | 2.2 | 10 min. | P-60 | Fs-60 | 100 | P-100 | 3H+ | Y-ORP |
| " | 360° F. | " | 2.0 | 10 min. | P-60 | Fs-60 | 100 | F-80 | 4H | V-Y-ORP |
| " | 270° F. | " | 2.0 | 20 min. | P-60 | P-60 | 100 | P-100 | 3H+ | S-Y-ORP |
| " | 300° F. | " | 2.0 | 20 min. | P-60 | P-60 | 100 | P-100 | 3H+ | Y-S-ORP |
| " | 360° F. | " | 2.4 | 20 min. | P-60 | P-60 | 100 | P-100 | 3H+ | V-Y-S-ORP |
| " | 270° F. | " | 2.0 | 30 min. | P-60 | P-60 | 100 | P-100 | 3H+ | S-Y-ORP |
| " | 300° F. | " | 2.1 | 30 min. | P-60 | P-60 | 100 | P-100 | 4H+ | Y-S-ORP |
| " | 360° F. | " | 2.7 | 30 min. | P-60 | Fs-60 | 100 | P-100 | 4H+ | V-Y-S-ORP |

Table 2 shows that good gloss was obtained at cure temperatures of 270° F. and 10 minute cure cycles. However, better results in terms of impact resistance are obtained at high temperatures. This would be expected. It is important to note that dicyandiamide will not effect cure of this resin at these low temperatures and in the same time frame, but requires higher temperatures to achieve the same physical properties.

When the catalyst level was reduced to 5 phr concentration, the gel time was substantially slower than at the 7 phr level. Gel times were 300 seconds at 270° F. and 69 seconds at 400° F. In addition, the coatings would not pass the 100 double rubs of MEK solvent after a 30-minute cure at 360° F. Although these results show significant reduction in gel time over dicyandiamide, the results are not as favorable as obtained at the 7 phr level, and thus on a commercial scale, the 7 phr level would be preferred.

EXAMPLE 7

A diethylene glycol extended isophorone diisocyanateimidazole adduct (DEG-IPDI-I) formed in a 1:2:2 mole ratio in the same manner as the Example 2 catalyst was used in combination with dicyandiamide and the combination tested for its effectiveness in gelling D.E.R. 663U epoxy resin. With a combination of 4 phr, DEG-IPDI-I and 3 phr dicyandiamide, at 360° F. the gel time was 68 seconds. On the other hand, when DEG-PIDI-I was used alone at a level of 8.3 phr, the gel time at 360° F. was 68 seconds.

which is a mixture containing 90% dicyandiamide and 10% 2-methyl imidazole; DEG-TDI-I refers to the diethylene glycol-toluene diisocyanate blocked imidazole of Example 2 and IPDI-I refers to the isophorone diisocyanate blocked imidazole of Example 1.

The results in Table 1 show that the catalysts of this invention are more reactive than D.E.H.-40/dicy combination at the lower temperatures. While cure at 260° F. for 15 minutes with D.E.H.-40/dicy showed very little cure each of the catalysts of this invention showed reactivity by virtue of their higher impact resistance. With respect to IPDI-I, greater reactivity is shown at the higher temperatures, i.e., at 320° F. and 356° F. With respect to DEG-TDI-I, good impact strengths are shown. It is believed slightly higher concentrations (8–9 phr) would enhance cure as the level of imidazole is quite low.

Coating properties in the form of pinholes and orange peel were inferior to those obtained with D.E.H.-40 and it is believed this is due to a number of factors. The primary reason for the pinholes and orange peel is believed due to isocyanate reaction and polymerization with trace amounts of water in the system. Thus, in formulation care should be exercized to keep water out of the solvent or resin system as the resultant polymeric catalyst product may result in coating irregularities. A secondary reason is that the viscosity of the resin is high and a slightly lower molecular weight resin, e.g. in the neighborhood of 650 epoxide equivalent, might result in less orange peel.

TABLE 3

| Catalyst | Cure Temp. °F. | Minutes | Appearance | Gloss (60°) | MEK Resistance | Impact (m.lbs.) Direct | Impact (m.lbs.) Reverse | Flex ⅛" Mandrel | Yellow Index |
|---|---|---|---|---|---|---|---|---|---|
| DEH-40 2.3 Dicy | | | | | | | | | |
| 2.3 phr Dicy | 260° F. | 15 | | 97 | Failed | <80 | — | | −2.67 |
| " | " | 30 | Slight Orange Peel | 99 | Pass | >160 | >160 | Pass | −2.04 |
| " | " | 60 | | 97 | Pass | >160 | >160 | | −0.67 |
| " | 320° F. | 5 | | 96 | Gloss Loss | <100 | >80 | | −1.87 |
| " | " | 10 | Smooth | 99 | Gloss Loss | >160 | >160 | Pass | −1.65 |
| " | " | 20 | | 100 | Pass | >160 | >160 | | −1.45 |
| " | 356° F. | 2 | | 96 | Gloss Loss | <100 | <100 | | −2.32 |
| " | " | 5 | Smooth | 97 | Gloss Loss | >160 | >160 | | −2.25 |
| " | " | 10 | | 99 | Pass | >160 | >160 | Pass | −2.10 |
| DEG-TDI-I | | | | | | | | | |
| 4 phr | 260° F. | 15 | Many Pinholes | 78 | Less Yellow | 140–160 | 100 | Pass | 2.86 |
| " | 320° F. | 10 | Pinholes | 79 | Less Yellow | 100–160 | 100–160 | Pass | 11.40 |
| " | 356° F. | 5 | Pinholes | 74 | Gloss Loss | 100–160 | 100–160 | Pass | 13.15 |
| DEG-TDI-I | | | | | | | | | |
| 7 phr | 260° F. | 15 | Many Pinholes | 89 | Pass | 100–160 | 100–160 | Fail | 3.87 |
| " | 320° F. | 10 | Many Pinholes | 84 | Pass | 100–160 | 100–160 | Fail | 13.00 |
| " | 356° F. | 5 | Many Pinholes | 76 | Pass | 100–160 | 100–160 | Pass | 15.87 |
| DEG-TDI-I | | | | | | | | | |
| 4 phr and 4 phr Dicy | 260° F. | 15 | Many Pinholes | 82 | Sl. Gloss Loss | >160 | 160 | Pass | −0.49 |
| 4 phr and 4 phr Dicy | 320° F. | 10 | Many Pinholes | 89 | Pass | 160 | 160 | Pass | −0.04 |
| 4 phr and 4 phr Dicy | 356° F. | 5 | Many Pinholes | 85 | Pass | 160 | 160 | Pass | 0.82 |
| IPDI-I | | | | | | | | | |
| 4 phr | 266° F. | 15 | Orange Peel | 95 | Pass | >160 | 160 | Fail | 8.35 |
| " | 320° F. | 10 | Orange Peel | 99 | Pass | >160 | >160 | Pass | 14.45 |
| " | 356° F. | 5 | Orange Peel | 99 | Pass | >160 | >160 | Pass | 19.20 |
| IPDI-I | | | | | | | | | |
| 5 phr | Gelled in Extruder | | | | | | | | |
| IPDI-I | | | | | | | | | |
| 4 phr Dicy | 266° F. | 15 | Orange Peel | 82 | Pass | 140 | 140 | Fail | 0.47 |
| " | 320° F. | 10 | Orange Peel | 88 | Sl. Gloss Loss | >160 | >160 | Pass | 4.46 |
| " | 356° F. | 5 | Orange Peel | 88 | Pass | >160 | >160 | Pass | 7.56 |
| imidazole | | | | | | | | | |
| 4 phr | gels in extruder | | | | | | | | |

EXAMPLE 9

A trimethylol-propane extended isophorone diisocyanate blocked 2-methyl imidazole was prepared in the same manner as in the catalyst of Example 2 except for the appropriate substitution of reactants and the use of 1:3:3 mole ratio. The gel time with D.E.R. 663U resin at 5 phr at 270° F. was 81 seconds.

When tested according to Example 5, the following results were obtained.

| Cure time | Thick (mils) | Impact Open | Impact Reverse | Gloss | MEK | Hardness |
|---|---|---|---|---|---|---|
| 10 min. @270° F. | 2.3 | F-120 | P-90 | 100 | P-50 | 4H+ |
| 15 min. @270° F. | 2.9 | P-120 | P-90 | 100 | P-100 | 4H+ |
| 20 min. @270° F. | 2.8 | P-120 | P-120 | 100 | P-100 | 4H+ |
| 30 min. @270° F. | 2.5 | P-120 | P-120 | 100 | P-100 | 4H+ |
| 40 min. @270° F. | 2.6 | P-120 | P-120 | 100 | P-100 | 4H+ |

EXAMPLE 10

A hydrogenated diisocyanate (sold under the trademark Hylene W by E. I. DuPont)-2-methyl imidazole adduct was formed in the manner as the catalyst of Example 1. The gel time at 270° F. in D.E.R. 663U was 157 seconds. When evaluated in the manner described in Example 6 at 7.0 phr, the following results were obtained.

| Cure time | Thick (mils) | Impact Open | Impact Reverse | Gloss | MEK | Hardness |
|---|---|---|---|---|---|---|
| 8 min. @270° F. | 1.8 | P-120 | P-120 | 100 | P-100 | 4H |
| 10 min. @270° F. | 1.8 | P-120 | P-120 | 100 | P-100 | 4H |
| 20 min. @270° F. | 1.9 | P-120 | P-160 | 100 | P-100 | 4H |

EXAMPLE 11

The procedure of Example 10 was repeated except that imidazole was substituted for 2-methyl imidazole. The mole ratio remained 1:2. When evaluated, the following results were obtained.

| Cure Time | Thick (mils) | Impact Open | Impact Reverse | Gloss | MEK | Hardness |
|---|---|---|---|---|---|---|
| 8 min. @270° F. | 1.9 | F-30 | F-30 | 100 | F-6 | 4H |
| 10 min. @270° F. | 1.8 | P-60 | P-60 | 100 | P-100 | 4H |
| 20 min. @270° F. | 1.9 | P-60 | P-60 | 100 | P-100 | 4H |

EXAMPLE 12

A diphenyl methane diisocyanate-2-methyl imidazole adduct was prepared in accordance with the method of Example 1 except for the substitution of the appropriate reactants.

The gel time of the D.E.R. 663U resin catalyzed with 5 phr at 270° F. was 184 seconds.

When the resin was formulated in the manner of Example 6, the following results were obtained.

| Cure Time | Thick (mils) | Impact Open | Impact Reverse | Gloss | MEK | Hardness |
|---|---|---|---|---|---|---|
| 10 min. @270° F. | 1.9 | P-60 | P-45 | 100 | P-100 | 4H |
| 15 min. @270° F. | 1.8 | P-60 | P-45 | 100 | P-100 | 4H |
| 20 min. @270° F. | 1.8 | P-60 | P-60 | 100 | P-100 | 4H |
| 40 min. @270° F. | 1.8 | P-60 | P-60 | 100 | P-100 | 4H |

EXAMPLE 13

A toluene diisocyanate-benzimidazole adduct in a mole ratio of 1:2 was formed in the same manner as the catalyst of Example 1. When used at a level of 5 phr with D.E.R. 663U, a gel time of 192 seconds was obtained at a cure temperature of 360° F.

A diphenyl methane diisocyanate-benzimidazole adduct in a 1:2 mole ratio was formed in the same manner as the toluene diisocyanate-benzimidazole adduct. When incorporated into D.E.R. 663U resin at a level of 5 phr, a gel time of 108 seconds at 360° F. was obtained. These two examples show that the fused aromatic ring adjacent to the imidazole ring retards the activity of the catalysts and thereby reducing its activity.

EXAMPLE 14

A toluene diisocyanate-2-methylimidazoline catalyst was prepared in accordance with the procedure of Example 1. More specifically, 21.1 grams of 2-methylimidazoline was dissolved in 170 mls tetrahydrofuran (dried). The solution was then added to 21.8 grams of toluene diisocyanate sold under the trademark Hylene$^{TM}$. The temperature of reaction was maintained between 40° and 50° C. with an ice water bath. The product was recovered in the same manner as the product in Example 1.

When the TDI-2-methyl imidazoline catalyst is used at a level of 5 phr in D.E.R. 663U epoxy resin, a gelation time of 64 seconds at 360° F. was obtained.

EXAMPLE 15

The procedure of Example 14 was repeated except that isophorone diisocyanate was substituted for toluene diisocyanate. An isophorone diisocyanate blocked 2-methyl imidazoline product was recovered.

When the catalyst was used at 5 phr in D.E.R. 663U epoxy resin, a gel time of 65 seconds at 270° F. was obtained.

EXAMPLE 16

The procedure of example 2 was employed to form a diethylene glycol-toluene diisocyanate-2-methyl imidazoline catalyst.

When the catalyst was used at 10 phr in D.E.R. 663U resin, a gel time of 180 seconds at 270° F. was obtained. It is believed that the low concentration of imidazoline accounts for the higher gel time. In addition, based on the results the isocyanate blocked imidazolines are less effective than the isocyanate blocked imidazole catalyst systems.

What is claimed is:

1. In a process for curing a finely divided 1-2 epoxy resin having a lower softening point of not less than 40° C. by heating said epoxy resin to an elevated temperature in the presence of a catalyst, the improvement which comprises heating said epoxy resin in the presence of a blocked adduct formed by reacting a polyisocyanate with a secondary amine represented by the formula:

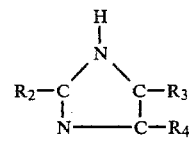

wherein

R$_2$ is hydrogen, hydrocarbyl, or inertly-substituted hydrocarbyl; and

R$_3$ and R$_4$ are each independently hydrogen, hydrocarbyl or inertly-substituted hydrocarbyl provided that R$_3$ and R$_4$ are not fused into an aromatic ring.

2. The process of claim 1 wherein said polyisocyanate is a diisocyanate.

3. The process of claim 2 wherein R$_2$ is hydrogen or a lower alkyl group having from 1 to 3 carbon atoms.

4. The process of claim 3 wherein R$_3$ is hydrogen or a lower alkyl group having from 1 to 3 carbon atoms.

5. The process of claim 4 wherein R$_4$ is hydrogen or a lower alkyl group having from 1 to 3 carbon atoms.

6. The process of claim 5 wherein R$_2$ is selected from the group consisting of hydrogen and a methyl group.

7. The process of claim 2 wherein said blocked adduct is included in a proportion of 1-15 parts by weight per 100 parts of said epoxy resin.

8. The process of claim 7 wherein said secondary amine is blocked by reaction with a cyclic diisocyanate.

9. The process of claim 8 wherein said blocked adduct is formed by reacting said diisocyanate with a polyol and said secondary amine.

10. The process of claim 9 wherein said polyol is a lower alkane polyol.

11. The process of claim 10 wherein in said blocked adduct, from about 0.5-1 equivalents hydroxyl group and from 1-1.5 moles secondary amine are reacted per mole of diisocyanate.

12. The process of claim 7 wherein R$_3$ and R$_4$ are hydrogen.

13. The process of claim 12 wherein said epoxy resin is a bisphenol A epoxy resin.

14. The process of claim 13 wherein the blocked adduct is included at a level of from 2-9 parts per 100 parts resin and from 2-5 parts dicyandiamide are included per 100 parts resin.

15. The process of claim 13 wherein said cyclic diisocyanate is selected from the group consisting of toluene diisocyanate and isophorone diisocyanate.

16. An epoxy compound having a lower softening point of at least 40° C. containing from 1-15 parts by weight of the blocked adduct formed by the reaction of a polyisocyanate and the secondary amines represented by the formula of claim 1.

* * * * *